United States Patent
Qiao et al.

(10) Patent No.: US 11,810,534 B1
(45) Date of Patent: Nov. 7, 2023

(54) DISTORTION CONTROL IN DISPLAYS WITH OPTICAL COUPLING LAYERS

(71) Applicant: Apple Inc., Cupertino, CA (US)

(72) Inventors: Yi Qiao, San Jose, CA (US); Jean-Pierre S. Guillou, Los Gatos, CA (US); Yingying Tang, Sunnyvale, CA (US); Michael J. Brown, Campbell, CA (US); Paul C. Kelley, San Francisco, CA (US); Tyler R. Kakuda, Stockton, CA (US); Hao Dong, Santa Clara, CA (US); Ying-Chih Wang, Sunnyvale, CA (US); Chaohao Wang, Sunnyvale, CA (US); Shaorui Yang, Milpitas, CA (US); Wei H. Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 481 days.

(21) Appl. No.: 16/566,530

(22) Filed: Sep. 10, 2019

Related U.S. Application Data

(60) Provisional application No. 62/731,468, filed on Sep. 14, 2018.

(51) Int. Cl.
*G09G 5/37* (2006.01)
*G06T 5/00* (2006.01)
(Continued)

(52) U.S. Cl.
CPC .................. *G09G 5/37* (2013.01); *G06T 1/20* (2013.01); *G06T 5/006* (2013.01); *G06T 7/70* (2017.01);
(Continued)

(58) Field of Classification Search
CPC ........ G09G 5/37; G09G 3/3208; G09G 5/363; G09G 2320/0646; G06T 7/70; G06T 1/20; G06T 5/006; G02B 6/06
See application file for complete search history.

(56) References Cited

U.S. PATENT DOCUMENTS

| 4,349,817 A | 9/1982 | Hoffman et al. |
| 4,534,813 A | 8/1985 | Williamson et al. |

(Continued)

FOREIGN PATENT DOCUMENTS

KR 20180034832 A 4/2018

OTHER PUBLICATIONS

Onufrak, Michelle A. Visbal, Raymond L. Konger, and Young L. Kim. "Telecentric suppression of diffuse light in imaging of highly anisotropic scattering media." Optics letters 41.1 (2016): 143-146. (Year: 2016).*

(Continued)

*Primary Examiner* — Xin Sheng
(74) *Attorney, Agent, or Firm* — Treyz Law Group, P.C.; Joseph F. Guihan

(57) ABSTRACT

An electronic device may have a display layer for displaying images. An optical coupling layer having an input surface that receives light from the display panel may convey the light from the input surface to an output surface. The output surface may have different dimensions than the display layer and may have any desired shape. To account for the displacement of light between the active area and the outer surface of the optical coupling layer and to ensure the output image is perceived with the desired distortion, image data may be rendered for the output surface then modified to account for the distortion and displacement that will occur later when the image is transported by the optical coupling layer from the display active area to the output surface of the optical coupling layer. Image distortion control circuitry may modify the rendered image data based on a distortion map.

3 Claims, 11 Drawing Sheets

(51) Int. Cl.
  *G09G 3/3208* (2016.01)
  *G06T 1/20* (2006.01)
  *G06T 7/70* (2017.01)
  *G09G 5/36* (2006.01)
  *G02B 6/06* (2006.01)

(52) U.S. Cl.
  CPC .......... *G09G 3/3208* (2013.01); *G09G 5/363* (2013.01); *G02B 6/06* (2013.01); *G09G 2320/0646* (2013.01)

(56) References Cited

U.S. PATENT DOCUMENTS

| | | | |
|---|---|---|---|
| 5,329,386 A | 7/1994 | Birecki et al. | |
| 5,502,457 A | 3/1996 | Sakai et al. | |
| 5,659,378 A | 8/1997 | Gessel | |
| 6,046,730 A | 4/2000 | Bowen et al. | |
| 6,407,785 B1 | 6/2002 | Yamazaki | |
| 6,467,922 B1 | 10/2002 | Blanc et al. | |
| 6,680,761 B1 | 1/2004 | Greene et al. | |
| 6,845,190 B1 | 1/2005 | Smithwick et al. | |
| 7,228,051 B2 | 6/2007 | Cok et al. | |
| 7,542,209 B2 | 6/2009 | McGuire, Jr. | |
| 7,823,309 B2 | 11/2010 | Albenda | |
| 7,856,161 B2 | 12/2010 | Tabor | |
| 8,045,270 B2 | 10/2011 | Shin et al. | |
| 8,723,824 B2 | 5/2014 | Myers et al. | |
| 8,824,779 B1 | 9/2014 | Smyth | |
| 8,976,324 B2 | 3/2015 | Yang et al. | |
| 9,268,068 B2 | 2/2016 | Lee | |
| 9,274,369 B1* | 3/2016 | Lee | G02F 1/133524 |
| 9,312,517 B2 | 4/2016 | Drzaic et al. | |
| 9,342,105 B2 | 5/2016 | Choi et al. | |
| 9,509,939 B2 | 11/2016 | Henion et al. | |
| 9,591,765 B2 | 3/2017 | Kim et al. | |
| 9,755,004 B2 | 9/2017 | Shieh et al. | |
| 9,818,725 B2 | 11/2017 | Bower et al. | |
| 9,907,193 B2 | 2/2018 | Lee et al. | |
| 10,048,532 B2 | 8/2018 | Powell et al. | |
| 10,052,831 B2 | 8/2018 | Welker et al. | |
| 2004/0184011 A1* | 9/2004 | Raskar | G03B 21/26 353/94 |
| 2006/0016448 A1 | 1/2006 | Ho | |
| 2007/0097108 A1 | 5/2007 | Brewer | |
| 2007/0291233 A1* | 12/2007 | Culbertson | H04N 9/3194 353/34 |
| 2008/0144174 A1 | 6/2008 | Lucente et al. | |
| 2008/0186252 A1 | 8/2008 | Li | |
| 2010/0177261 A1 | 7/2010 | Jin et al. | |
| 2010/0238090 A1 | 9/2010 | Pomerantz et al. | |
| 2011/0025594 A1 | 2/2011 | Watanabe | |
| 2011/0057861 A1 | 3/2011 | Cok et al. | |
| 2011/0102300 A1 | 5/2011 | Wood et al. | |
| 2011/0242686 A1 | 10/2011 | Wantanbe | |
| 2012/0218219 A1 | 8/2012 | Rappoport et al. | |
| 2013/0081756 A1 | 4/2013 | Franklin et al. | |
| 2013/0082901 A1* | 4/2013 | Watanabe | G09G 3/3666 345/1.3 |
| 2013/0083080 A1 | 4/2013 | Rappoport et al. | |
| 2013/0235560 A1 | 9/2013 | Etienne et al. | |
| 2013/0279088 A1 | 10/2013 | Raff et al. | |
| 2014/0037257 A1 | 2/2014 | Yang et al. | |
| 2014/0092028 A1 | 4/2014 | Prest et al. | |
| 2014/0092346 A1 | 4/2014 | Yang et al. | |
| 2014/0183473 A1 | 7/2014 | Lee et al. | |
| 2014/0240985 A1 | 8/2014 | Kim et al. | |
| 2014/0328041 A1 | 11/2014 | Rothkopf et al. | |
| 2014/0354920 A1 | 12/2014 | Jang et al. | |
| 2015/0093087 A1 | 4/2015 | Wu | |
| 2015/0163376 A1* | 6/2015 | Pan | H04N 1/4072 358/461 |
| 2015/0227227 A1 | 8/2015 | Myers et al. | |
| 2016/0231784 A1 | 8/2016 | Yu et al. | |
| 2016/0234362 A1 | 8/2016 | Moon et al. | |
| 2017/0235341 A1 | 8/2017 | Huitema et al. | |
| 2018/0052312 A1 | 2/2018 | Jia et al. | |
| 2018/0088416 A1 | 3/2018 | Jiang et al. | |
| 2018/0113241 A1* | 4/2018 | Powell | G06F 1/1626 |
| 2018/0372958 A1* | 12/2018 | Karafin | G02B 6/02042 |

OTHER PUBLICATIONS

Luster, Spencer. "Using telecentric lenses in inspection systems." Vis. Syst. Des. 10.1 (2005): 28. (Year: 2005).*

* cited by examiner

DISTORTION CONTROL IN DISPLAYS WITH OPTICAL COUPLING LAYERS

This application claims the benefit of provisional patent application No. 62/731,468, filed Sep. 14, 2018, which is hereby incorporated by reference herein in its entirety.

FIELD

This relates generally to electronic devices and, more particularly, to electronic devices with displays.

BACKGROUND

Electronic devices such as cellular telephones, tablet computers, and other electronic equipment may include displays for presenting images to a user. In a typical configuration, a rectangular array of display pixels is located in a central active region in the display. An inactive border region surrounds the central active region. Components such as driver circuits can be formed in the inactive border region. The inactive border must generally contain sufficient space for these components, because these components are used in controlling the operation of the display. Nevertheless, excessively large inactive border regions may make a device overly large and may detract from device aesthetics. It would therefore be desirable to be able to provide improved displays for an electronic device.

SUMMARY

An electronic device may have a display panel for displaying images. The display panel may include an array of organic light-emitting diode pixels. A display cover layer may overlap the display panel. Portions of the surface of the display cover layer may have curved profiles.

An optical coupling layer may be included in the electronic device. The optical coupling layer may have an input surface that receives light from the array of pixels. The light from the array of pixels may be conveyed from the input surface to an output surface. The output surface may be adjacent to an inner surface of the display cover layer. The output surface may have different dimensions than the display panel and may have any desired shape. The optical coupling layer may be formed from a coherent fiber bundle or a layer of Anderson localization material.

Using the optical coupling layer may present challenges in ensuring an image of a desired appearance is displayed for the viewer of the display. The location where light is emitted from the pixel on the active area may be different than the location where light is visible on the output surface of the optical coupling layer. Additionally, it may be desirable for the display to appear as though it is a planar display without edge curvature (even if the output surface has edge curvature).

To account for the displacement of light between the active area and the outer surface of the optical coupling layer and to ensure the output image is perceived with the desired distortion, image data may be rendered for the output surface then modified to account for the distortion and displacement that will occur later when the image is transported by the optical coupling layer from the display active area to the output surface of the optical coupling layer. Image distortion control circuitry may modify the rendered image data based on a distortion map that includes displacement vectors for each pixel in the active area of the display.

DETAILED DESCRIPTION

Electronic devices may be provided with displays. The displays may have planar surfaces and curved surfaces. For example, a display may have a planar central portion surrounded by bent edges. The bent edges may have curved surface profiles. Arrangements in which displays exhibit compound curvature may also be used. Electronic devices having displays with curved surfaces may have an attractive appearance, may allow the displays to be viewed from a variety of different angles, and may include displays with a borderless or nearly borderless configuration.

Figure 1:
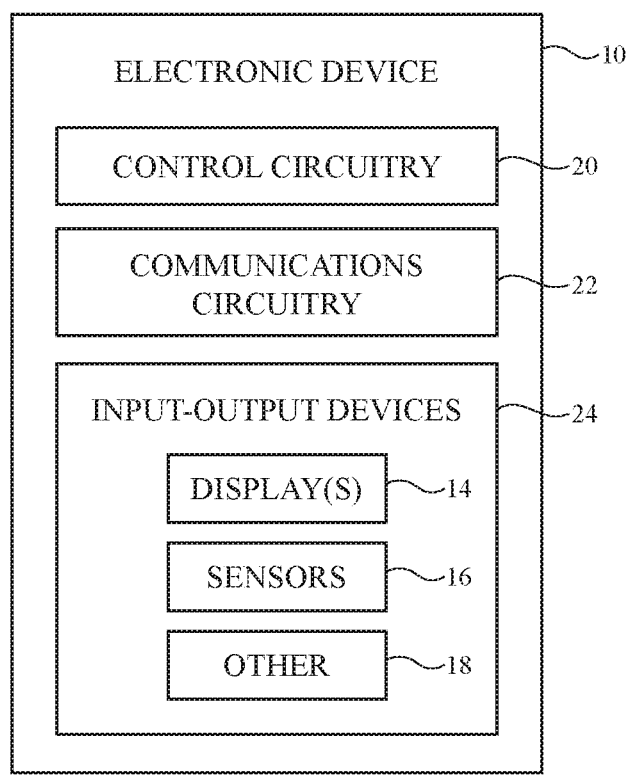
FIG. 1 is a schematic diagram of an illustrative electronic device having a display in accordance with an embodiment.

A schematic diagram of an illustrative electronic device having a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Display 14 may have an array of pixels configured to display images for a user. The display pixels may be formed on a substrate such as a flexible substrate (e.g., display 14 may be formed from a flexible display panel). Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display). Alternatively, a touch sensor for display 14 may be formed from opaque metal deposited between the pixels.

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, electronic device 10 may include additional components (see. e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
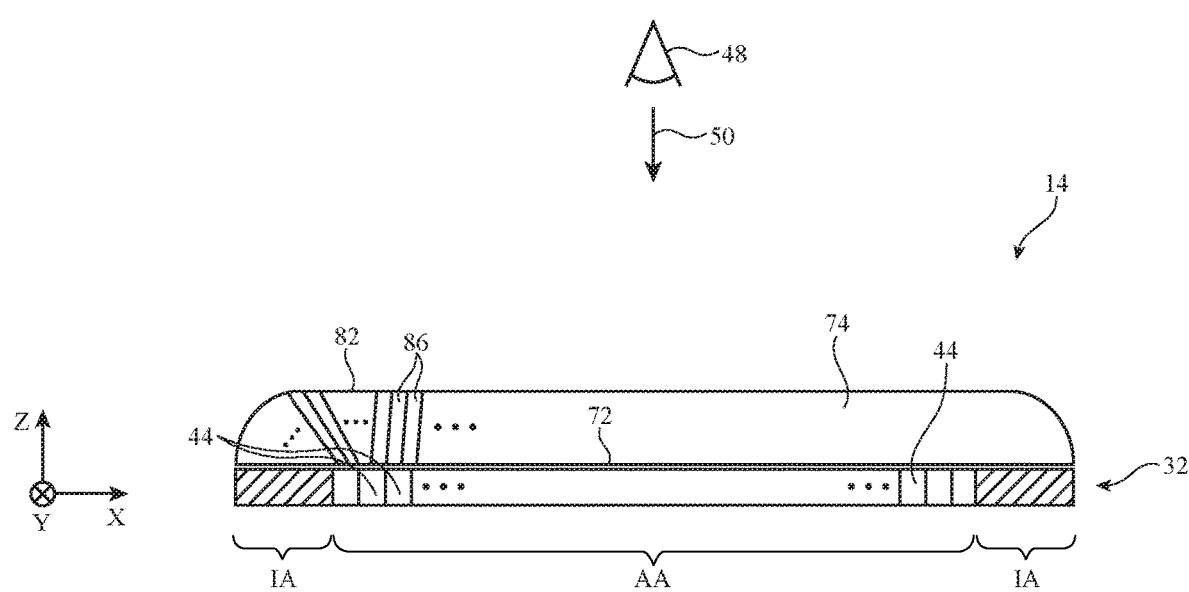
FIG. 2 is a cross-sectional side view of an illustrative electronic device having a display layer and an optical coupling layer in accordance with an embodiment.

FIG. 2 is a cross-sectional side view of an illustrative electronic device display having a display layer 32 (sometimes referred to as display panel 32 or display 32). As shown, the display layer includes an array of pixels 44 (e.g., liquid crystal display pixels or organic light-emitting diode display pixels) in an active area AA of the display. The active area is surrounded by inactive border region (sometimes referred as inactive area) IA. The inactive border region may include electronic components such as display driver circuitry used to operate display pixels 44 or other electronic components (e.g., input-output components such as sensors). The inactive area does not include pixels and therefore does not emit light.

The output surface of display layer 32 is a two-dimensional surface (e.g., parallel to the XY-plane) corresponding to the active area AA. The output surface of display layer 32 is surrounded by the inactive border region IA that does not emit light. It may be desirable for the output surface of the display to instead be a three-dimensional surface without an inactive border region.

To achieve the desired three-dimensional output surface without an inactive border region, display 14 may include one or more structures that transport image light from the two-dimensional surface of the array of pixels 44 to another surface while preventing the light from spreading laterally and thereby preserving the integrity of the image. This allows the image produced by an array of pixels in a flat display to be transferred from an input surface of a first shape at a first location to an output surface with compound curvature or other desired second shape at a second location. The optical coupling layer may therefore move the location of an image while changing the shape of the surface on which the image is presented. Examples of layers of material that can transfer image light in this way include coherent fiber bundles and Anderson localization material. These layers of material may sometimes be referred to herein as optical coupling layers or optical coupling structures.

An illustrative optical coupling layer 74 is shown in FIG. 2. During operation, light emitted from pixels 44 passes through layer 74 from input surface 72 to output surface 82. Output surface 82 may be a surface associated with the inner surface of a display cover layer or an outer surface of device 10. Illustrative output surface 82 may have any desired three-dimensional shape (e.g., with portions that curve out of the XY-plane as in FIG. 2). Output surface 82 may cover the inactive area IA of display layer 32. In this way, optical coupling layer 74 hides inactive area IA. When a viewer looks at display 14 from the front, if the optical coupling layer was not present there would be a visible inactive area IA from which no light is emitted. By including optical coupling layer 74, when a viewer looks at display 14 from the front, light is emitted across the entire width of the display (because light is rerouted from the active area to be emitted over the inactive area). Displays of the type shown in FIG. 2 may sometimes be referred to as borderless (because the light emitting output surface 82 may extend across the entire width of the device without any visible inactive areas that do not emit light).

As shown in FIG. 2, the curved portion of output surface 82 is formed over inactive area IA of display layer 32. The curved portion of output surface 82 uses light from the active area AA to hide inactive area IA. This arrangement provides a borderless appearance to display 14 when viewed by viewer 48 (because light is emitted across the entire display without any visible non-light-emitting portions).

In the example of FIG. 2, output surface 82 has a planar central portion over the active area and a curved portion over the inactive area. This example is merely illustrative. In general, output surface 82 may have any desired shape. For example, the portion of output surface 82 over active area AA may be curved (forming an entirely curved output surface for example). The portion of output surface 82 over active area AA may have any desired combination of curved portions and planar portions. In another embodiment, the portion of output surface 82 over inactive area IA may be planar (forming an entirely planar output surface for example). The portion of output surface 82 over inactive area IA may have any desired combination of curved portions and planar portions.

Optical coupling layer 74 of FIG. 2 may be formed from a coherent fiber bundle that includes a plurality of fibers 86. Fibers 86 may include fiber cores of a first refractive index surrounded by cladding (e.g., polymer binder) of a second, different refractive index. In one example, the fiber core may have a higher refractive index than the cladding. Alternatively, the fiber core may have a lower refractive index than the cladding. The difference in refractive index between the core and cladding may be greater than 0.1, greater than 0.2, greater than 0.4, greater than 0.6, greater than 0.8, etc. The fiber cores may be formed from fibers of glass, polymer, or other transparent material. Core diameters may be, for example, at least 5 microns, at least 7 microns, at least 8 microns, at least 9 microns, less than 40 microns, less than 17 microns, less than 14 microns, less than 11 microns, between 5 and 10 microns, between 15 and 25 microns, less than 30 microns, less than 25 microns, less than 20 microns, less than 100 microns, or other suitable diameter. The fibers in a coherent fiber bundle extend parallel to each other. Each pixel in the active area of the display may be overlapped by exactly one fiber, more than one fiber, or a portion of one fiber.

A viewer 48 of the display may typically view the display from the front. In this scenario, the viewer looks in a direction 50 that is orthogonal to the active area of the display. It is desirable that light from each fiber is directed towards viewer 48. Therefore, light from each fiber may be emitted from output surface 82 in a direction that is orthogonal to active area AA.

Each fiber may extend along a respective longitudinal axis between input surface 72 and output surface 82. For example, consider a fiber in the center of the active area. A fiber in the center of the active area may have a longitudinal axis that extends between input surface and output surface 82. The light emitted from the fiber may be emitted in the direction of the longitudinal axis. The longitudinal axis may be orthogonal to active area AA at input face 72. The longitudinal axis may also be orthogonal to active area AA at output face 82, ensuring that light is emitted from the fiber to viewer 48.

Next, consider a fiber in the periphery of the active area that extends over inactive area IA. A fiber in the periphery of the active area may also extend along a longitudinal axis between input surface 72 and output surface 82. The longitudinal axis 88-2 may be orthogonal to active area AA at input face 72. At output surface 82, the curvature of the optical coupling layer may result in the surface normal of the output face of the fiber being at a non-orthogonal angle relative to active area AA. Therefore, if light was emitted from the fiber in a direction along the surface normal of the output face, the light would be directed away from viewer 48. Therefore, the fiber may be bent to ensure that the longitudinal axis is at an angle approximately orthogonal to the active area at the output face.

The longitudinal axis of each fiber may be approximately (e.g., within 20° of, within 15° of, within 10° of, within 5° of, etc.) orthogonal to the active area at the output face of the optical coupling layer. This arrangement ensures that light from each fiber is directed towards viewer 48 at the front of the display.

The longitudinal axis of each fiber may be at approximately (e.g., within 20° of, within 15° of, within 10° of, within 5° of, etc.) the same angle relative to the active area at both the input face and the output face of the optical coupling layer. This may remain true even when the fibers are bent between the input surface and output surface (as with fibers in the edge of the optical coupling layer, for example).

Optical coupling layer 74 and display layer 32 may be separated by a distance of less than 500 microns, less than 100 microns, less than 50 microns, between 50 and 150 microns, between 50 and 500 microns, or any other desired distance.

The fibers may be bent at any desired bend angle and may have any desired maximum bend angle (e.g., 110°, 90°, 75°, etc.). The bend radius of the fibers may be selected to prevent excessive loss. In particular, the minimum bend radius of each fiber may be equal to ten times the radius of that fiber. This example is merely illustrative and may depend upon the tolerance for loss in a particular display. The minimum bend radius of each fiber may be equal to eight times the radius of the fiber, twelve times the radius of the fiber, five times the radius of the fiber, fifteen times the radius of the fiber, etc. The bend radius of each fiber may be greater than or equal to 50 microns, greater than or equal to 100 microns, greater than or equal to 25 microns, greater than or equal to 150 microns, greater than or equal to 200 microns, greater than or equal to 300 microns, greater than or equal to 400 microns, greater than or equal to 500 microns, etc.

Some of the fibers may have a uniform cross-sectional area whereas some of the fibers may have a varying cross-sectional area (e.g., some of the fibers may have a cross-sectional area at the input face that is different than the cross-sectional area at the output face). For example, fibers in the center of the optical coupling layer may have a cross-sectional area at the input face that is the same as the cross-sectional area at the output face. The cross-sectional areas at the input face and output face may be within 5% of each other, within 10% of each other, within 1% of each other, etc. Fibers in the edge of the optical coupling layer may have a cross-sectional area at the input face that is less than the cross-sectional area at the output face. For example, the cross-sectional areas at the input face and output face may differ by more than 10%, more than 20%, more than 50%, more than 100%, more than 200%, etc. The shape of the cross-section of the fiber may also change along the length of the fiber. For example, at the input face the fiber may have a circular or hexagonal cross-section. At the output face the fiber may have a different cross-sectional shape (e.g., an oval, distorted hexagon, etc.).

The curved portion of output surface 82 may be considered an arc with a central angle of greater than 10°, greater than 25°, greater than 45°, greater than 60°, greater than 70°, greater than 80°, greater than 90°, between 45° and 90°, etc.

The example of optical coupling layer 74 being formed from a coherent fiber bundle is merely illustrative. In an alternate embodiment, optical coupling layer 74 may be formed from Anderson localization material. Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material). The transversely random refractive index features may have widths of between 1 and 2 microns, between 0.5 microns and 2 microns, or other desired widths.

Including optical coupling layers (e.g., of the type shown in FIG. 2) in electronic device 10 may allow for an image generated by a planar display layer to be displayed on any arbitrary shaped display output surface. This may allow for aesthetically pleasing borderless displays with compound curvature (e.g., compound curvature in the corners of the display). However, using the optical coupling layer may present challenges in ensuring an image of a desired appearance is displayed for the viewer of the display. First, the location where light is emitted from the pixel on the active area may be different than the location where light is visible on the output surface of the optical coupling layer. This may be referred to as displacement or translation of light (e.g., from the active area to the optical coupling layer). Second, although the outer surface of optical coupling layer 74 has curved edges, it may be desirable for the curved edges not to be perceivable to the user. In other words, even though the viewer is actually viewing light from an optical coupling layer having an outer surface with edges that curve away from the viewer, it may be desirable for the display to appear as though it is a planar display without the edge curvature. Alternatively, in some cases it may be desirable for the distortion associated with the edges that curve away from the viewer to be visible to the user (e.g., so that the user perceives that the display has an edge that 'falls away' from the user). To account for the displacement of light between the active area and the outer surface of the optical coupling layer and to ensure the output image is perceived with the desired distortion, image data may be rendered for the output surface then 'pre-distorted' (e.g., modified) to account for the distortion and displacement that will occur later when the image is transported by the optical coupling layer from the display active area to the output surface of the optical coupling layer. For simplicity, herein 'distortion' (e.g., distortion of an image between being emitted by the active area and being visible on the output surface of the optical coupling layer) may be used to refer to both the displacement of the image and the perceived output surface shape of the image.

Figure 3:
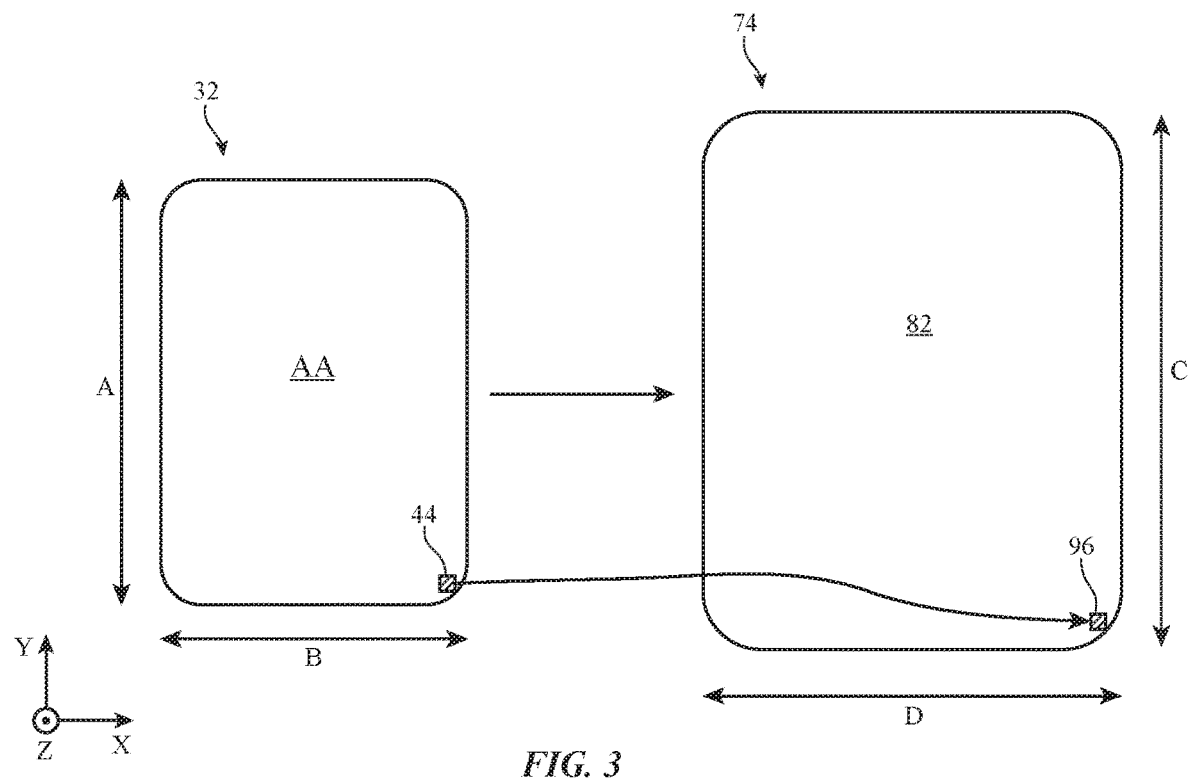
FIG. 3 is a schematic diagram showing how a light-emitting area may change between the active area of the display and the output surface of the optical coupling layer in accordance with an embodiment.

FIG. 3 is a diagram illustrating how an optical coupling layer may have different dimensions than an active area of a display layer that supplies images to the optical coupling layer. As shown in FIG. 3, display layer 32 has an active area AA with a height A and a width B. The active area may include pixels that emit light that is received by optical coupling layer 74. Optical coupling layer 74 guides the light to an output surface 82 where the light is output to a viewer. Output surface 82 of optical coupling layer 74 has a height C and width D. As shown in FIG. 3, the dimensions of output surface 82 may not match the dimensions of active area AA. In FIG. 3, height C of output surface 82 is greater than height A of active area AA and width D of output surface 82 is greater than width B of active area AA. Because the dimensions of output surface 82 and active area AA are different (and active area AA is used to supply light to the entire optical coupling layer), light emitted from pixels in the active area may end up being visible on different locations of the corresponding output surface 82.

Figure 4:
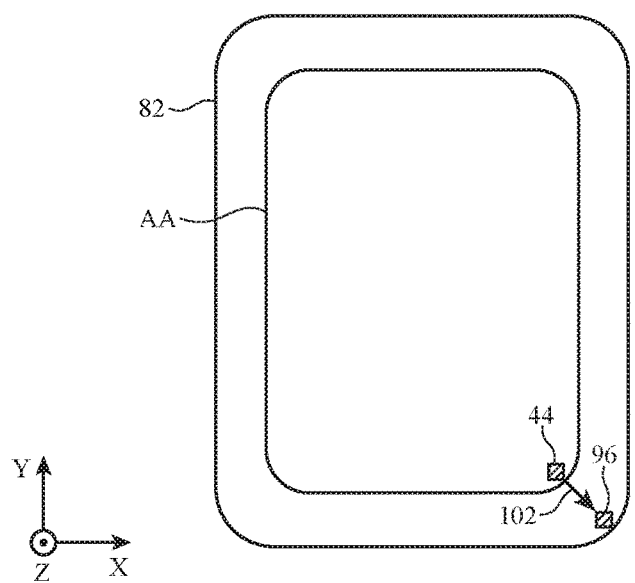
FIG. 4 is a top view of an illustrative electronic device having an optical coupling layer with an output surface that is larger than the active area of the underlying display layer in accordance with an embodiment.

Each pixel 44 emits light into optical coupling layer 74. The optical coupling layer 74 guides light from a given pixel 44 to a respective output location 96. However, output location 96 is at a different position within the XY-plane than the original pixel 44. FIG. 4 illustrates this concept by showing the relative positions of an output surface 82 that overlaps the active area AA but has larger dimensions than the active area. As shown, light from display pixel 44 ends up at location 96 (shifted within the XY-plane relative to display pixel 44). The displacement between the origin of light from pixel 44 and the final location of the emitted light 96 may be represented by a vector 102. Vector 102 may sometimes be referred to as displacement vector 102 (because it represents the displacement between the origin of light from pixel 44 and the final location of the emitted light 96).

The illustrative shapes shown in FIGS. 2-4 are merely illustrative. For example, in FIG. 3 active area AA is depicted as having a rectangular outline with rounded corners. This example is merely illustrative and active area AA may have another shape if desired. Output surface 82 of optical coupling layer 74 is also depicted as having a rectangular outline with rounded corners. Output surface 82 is shown as having edges that are curved downwards within the Z-dimension in. These examples are also merely illustrative. Output surface 82 may have any desired outline when viewed from above (e.g., in the negative Z-direction). Output surface 82 may also have any desired curvature within the Z-dimension (e.g., the output surface may be planar, may have 4 edges that curve in the negative Z-direction, may have 2 edges that curve in the negative Z-direction, may have corners that curve in the negative Z-direction, etc.). In general, output surface 82 of optical coupling layer 74 may have any arbitrary shape with any desired curvature in any dimension. However, an arrangement where output surface 82 has a rectangular outline with rounded corners and has edges that are curved in the negative Z-direction may sometimes be referred to herein as an example.

In order to display a desired image from output surface 82 of optical coupling layer 74, the relationship between the location of light emitted from the active area and where that light is emitted from the output surface 82 must be accounted for. For example, each pixel in active area AA may have an associated vector 102 indicating how the light is shifted within the XY-plane when emitted from output surface 82. To determine these displacement vectors for each pixel, a system as shown in FIG. 5 may be used.

Figure 5:
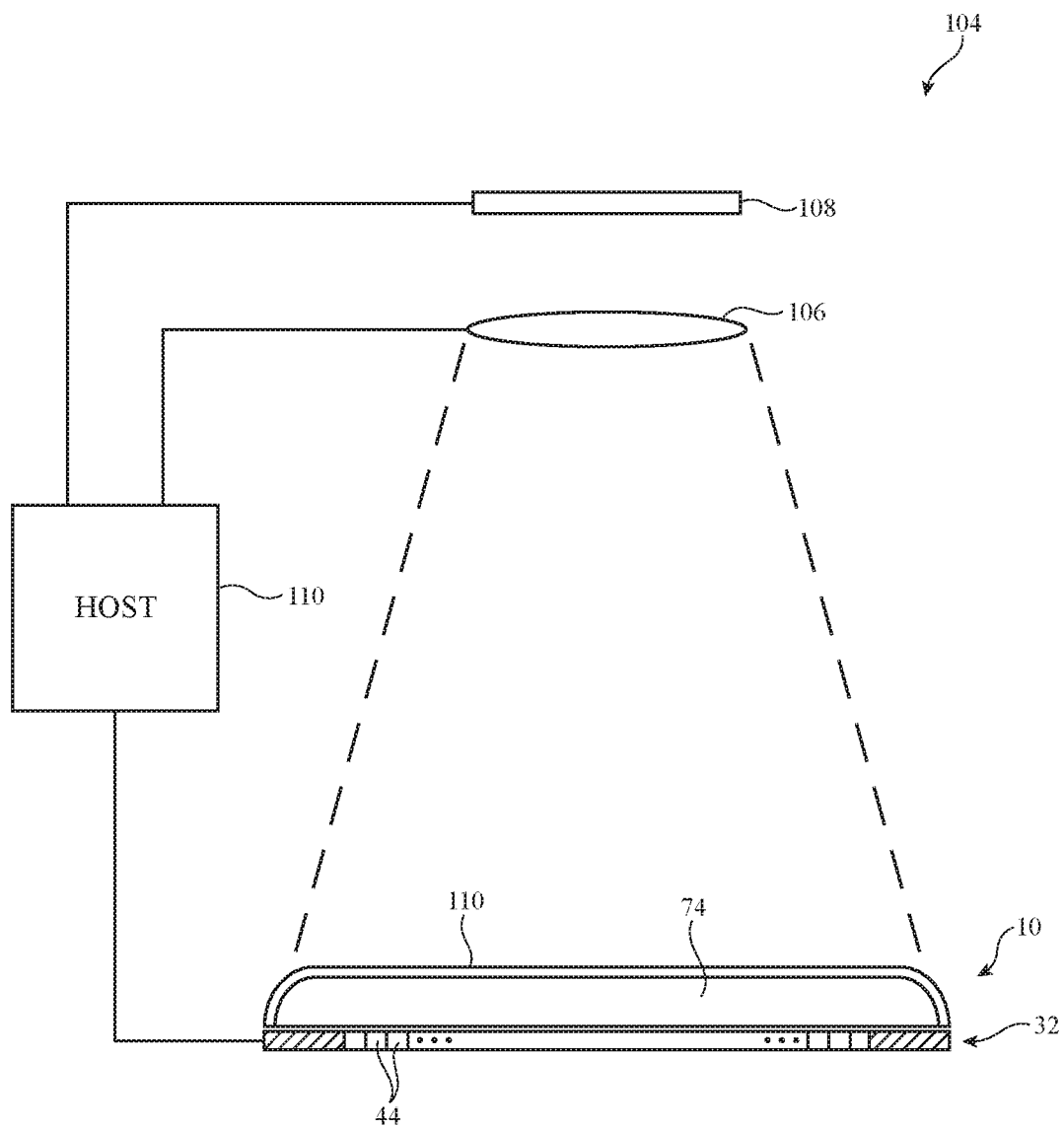
FIG. 5 is a schematic diagram of an illustrative system for measuring the distortion between light emitted from the active area of a display and the location where that light is visible on the output surface of the optical coupling layer of the display in accordance with an embodiment.

FIG. 5 is a schematic diagram of an illustrative system for characterizing the distortion between the light emitted from the active area and where that light is viewable from the output surface 82 of an optical coupling layer. As shown in FIG. 5, distortion characterization system 104 may include an electronic device 10 with a display layer 32 that includes pixels 44 and an optical coupling layer 74. In the example of FIG. 5, optical coupling layer is covered by display cover layer 110. Display cover layer 110 may be formed from a transparent material such as plastic, glass, etc. In FIG. 5 the electronic device may sometimes be referred to as a device under test (DUT).

During distortion characterization, the pixels 44 of display layer 32 may be used to display a target image. In one example, the target image may include a checkerboard pattern of black and white rectangles. This type of pattern may provide intersection points that can be easily compared to the original pixel data to determine displacement. However, this example is merely illustrative and the target image may be any desired image with any desired characteristics.

While display layer 32 displays the known target image (which is output from optical coupling layer 74), image sensor 108 (sometimes referred to as camera 108) captures an image of the electronic device through lens 106. Lens 106 may be a telecentric lens. Using a telecentric lens results in an orthographic view of electronic device 10 (e.g., the chief rays are orthogonal to image sensor 108). This example is merely illustrative and other types of lenses may be used if desired. Lens 106 may include more than one lens element and may sometimes be referred to as a lens module. Lens 106 and image sensor 108 may sometimes collectively referred to as a camera module.

Image sensor 108, lens module 106, and/or electronic device 10 (and display layer 32) may be controlled by host 110. Host 110 may include computing equipment such as a personal computer, laptop computer, tablet computer, or handheld computing device. Host 110 may include one or more networked computers. Host 110 may maintain a database of results, may be used in sending commands to image sensor 108, lens module 106, and/or electronic device 10, may receive data from image sensor 108, lens module 106, and/or electronic device 10, etc.

Figure 6:
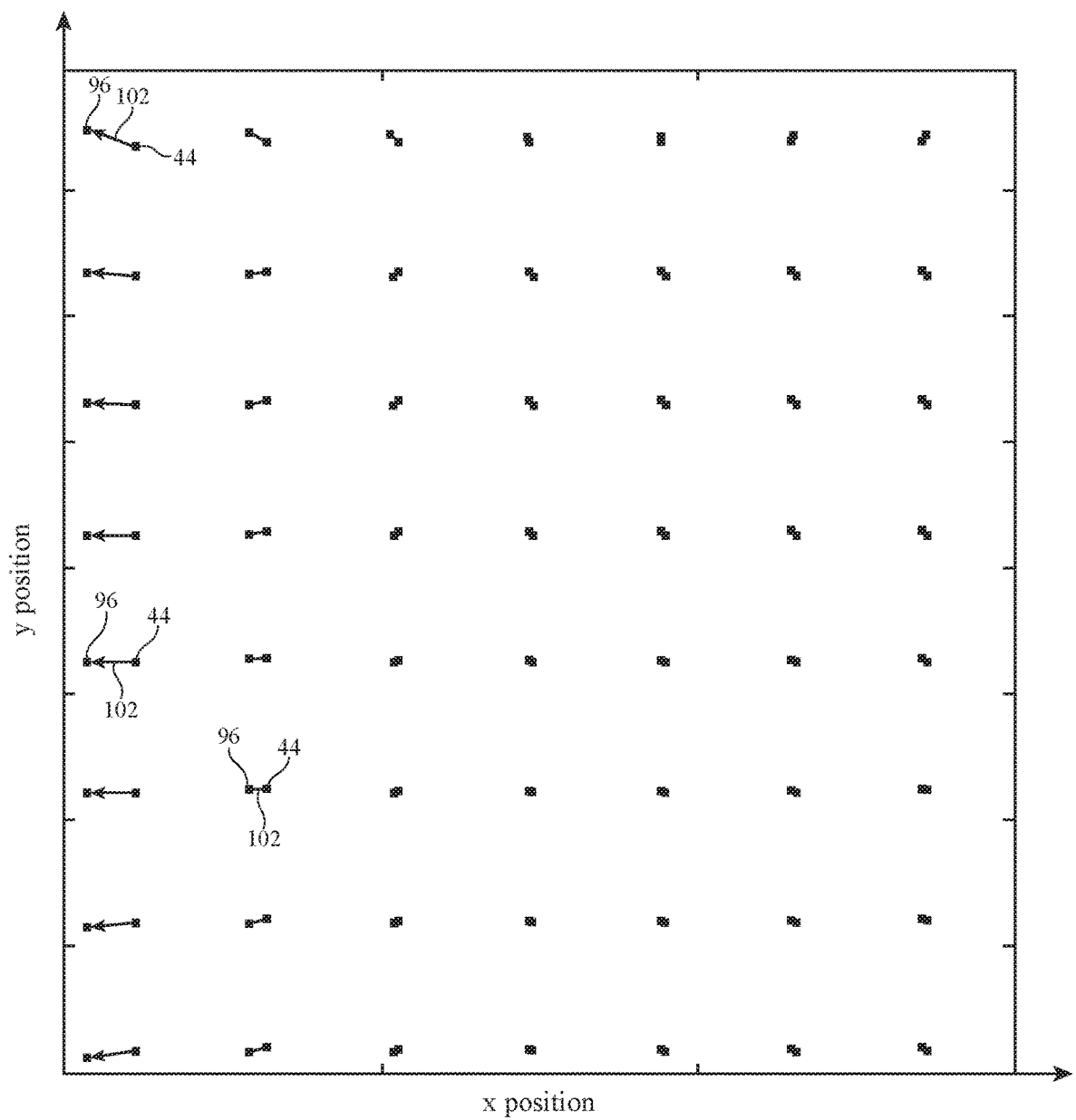
FIG. 6 is a graph of an illustrative vector map showing the displacement between selected display pixels and respective optical coupling layer pixels in accordance with an embodiment.

By capturing an image of the target displayed on electronic device 10 using image sensor 108, the correlation between a pixel's location in display layer 32 and where that pixel's light is visible on optical coupling layer 74 may be determined. FIG. 6 shows a vector map that illustrates the correlation between the locations of selected pixels 44 and their corresponding light output locations 96 on the optical coupling layer. Light output locations 96 may sometimes be referred to as optical coupling layer pixels 96. However, it should be understood that optical coupling layer pixels 96 are not actually generating light (just displaying light that is received from a corresponding display pixel 44).

As shown in FIG. 6, a selected subset of the pixels 44 may be analyzed to determine the vector 102 associated with the shift between display pixel 44 and corresponding optical coupling layer pixel 96. If desired, every pixel may be analyzed to determine the associated displacement vector 102. However, this comprehensive analysis may have an associated processing power and/or time consumption burden. Additionally, large amounts of memory may be required to store a vector associated with each and every pixel in display layer 32. Therefore, vectors 102 may only be determined for a subset of the pixels in the active area of the display. As shown in FIG. 6, pixels in a grid may be selected for direct vector measurement (i.e. using the system of FIG. 5). To determine the vector associated with a pixel that is not measured directly, interpolation (e.g., linear interpolation, cubic interpolation, or another desired type of interpolation) may be used.

The number and location of pixels directly measured (which, accordingly, determines the number of pixels determining using interpolation) may be selected based on the specific design requirements for the electronic device. In general, obtaining a displacement vector for every pixel may be the most accurate technique, but may be time consuming and require excessive computing power. If a displacement vector is obtained for too few pixels, however, the accuracy of the interpolated values may decrease. The optimum amount of interpolation may depend on the exact specifications of the display layer and optical coupling layer used and may depend on whether accuracy or speed is prioritized. In general, the number of pixels between selected pixels for which a displacement vector is obtained may be zero (i.e., a displacement vector is obtained for every pixel), one, two, three, four, five, more than five, more than eight, more than ten, more than twenty, more than thirty, more than fifty, more than sixty, more than eighty, more than one hundred, more than two hundred, more than three hundred, more than five hundred, less than one hundred, less than fifty, less than ten, between three and one hundred between fifty and seventy-five, between three and ten, etc.

The pixels selected for direct displacement vector measurement may be arranged in a uniform grid (as shown in FIG. 6). This example is merely illustrative, however. If desired, more selected pixels may be located in a first region of the display than a second region of the display. For example, distortion may be largest at the edges and corners of display layer 32. Therefore, the displacement vector for more pixels may be measured in the edges and corners of display layer 32 than in the center of display layer 32.

Figure 7:
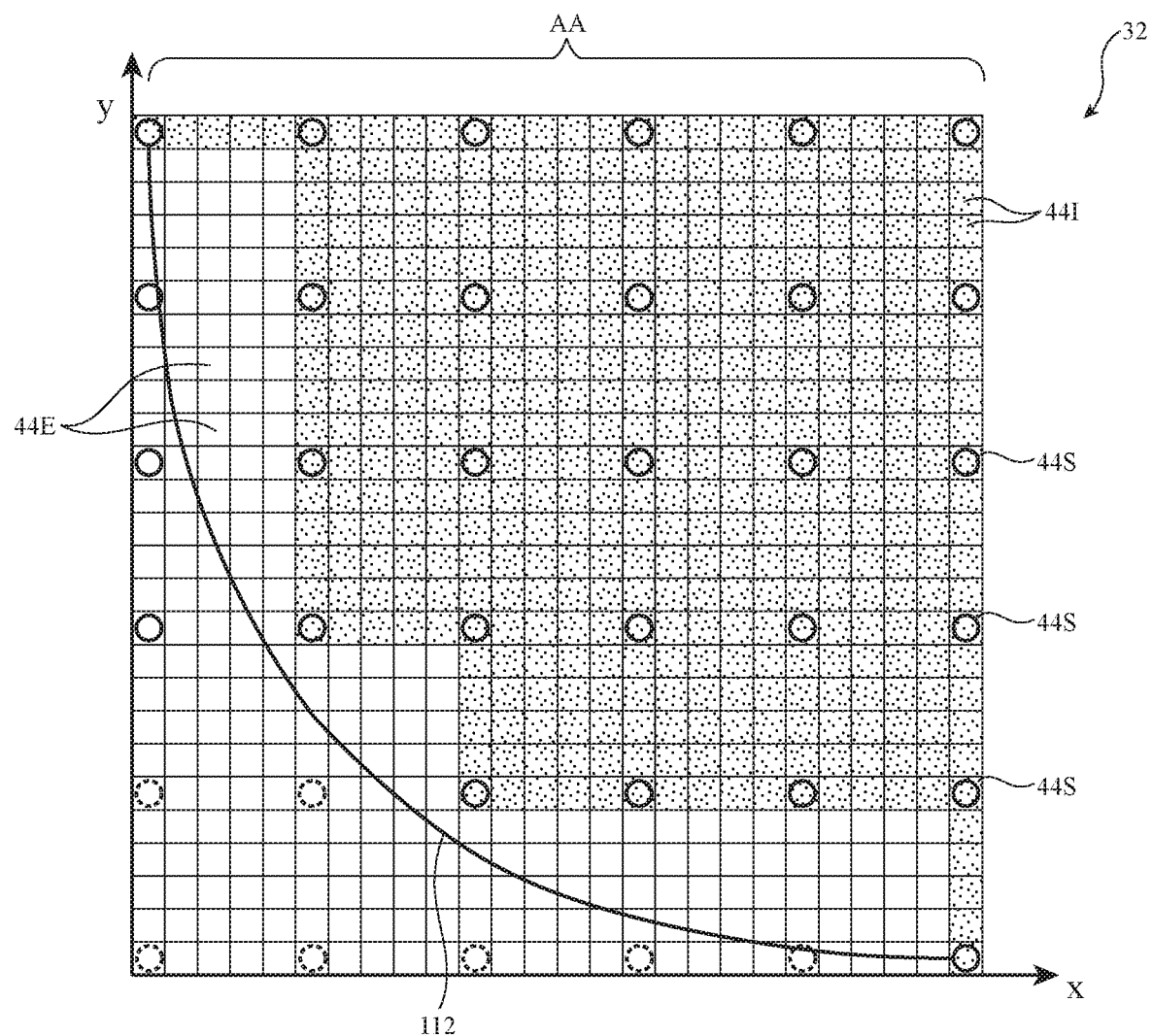
FIG. 7 is a top view showing how interpolation and extrapolation may be used to determine corresponding displacement vectors for some pixels in accordance with an embodiment.

In some cases, extrapolation may be used (instead of interpolation) to determine a displacement vector for a pixel that does not have a measured displacement vector. FIG. 7 is a top view of an illustrative display layer showing how the vector for each pixel in the display layer may be determined. As shown, display layer 32 may have an active area AA with a rounded corner defined by spline 112. Selected pixels 44S may have a vector that is directly measured (e.g., using the system of FIG. 5). The selected pixels are arranged in a grid as shown in FIG. 7. However, because the grid does not perfectly align with spline 112, there are some pixels that are interposed between spline 112 and pixels 44S for which interpolation cannot be used. In other words, the shaded pixels 44I in FIG. 7 are all interposed between selected pixels 44S. Therefore, interpolation may be used to determine an associated displacement vector for those pixels. For the unshaded pixels 44E, however, interpolation is not possible because the selected pixels that would be required for interpolation are on the other side of spline 112 and therefore are not present. Extrapolation (e.g., linear extrapolation or any other desired type of extrapolation) may therefore be used to determine the displacement vector associated with pixels 44E.

After determining the vector map using measurement, interpolation, and extrapolation, it is possible to map an intended output image (from the optical coupling layer) to pixel values to be displayed using display layer 32. When operating electronic device 10, for example, a desired image to be displayed may be rendered with desired brightness values for each optical coupling layer pixel 96. The vector map is then used to determine which display pixel 44 in layer 32 should be used to provide the desired brightness to each optical coupling layer pixel 96. The vector map may be associated with a perceived distortion of the output surface. For example, when a telecentric lens (as described in connection with FIG. 5) is used to obtain the vector map, the associated perceived output surface may be planar (e.g., the display will appear to be planar even though the optical coupling layer has a curved output surface). Vector maps associated with other perceived output surfaces may also be obtained if desired.

Figure 8:
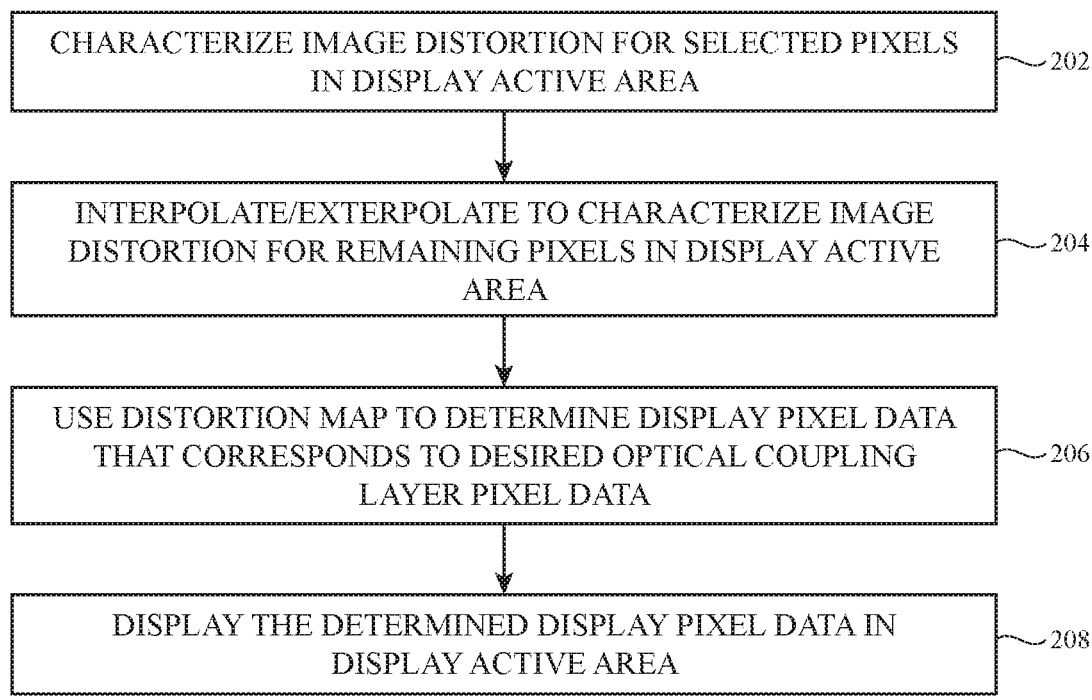
FIG. 8 is a flowchart of illustrative method steps for characterizing distortion in a display with an optical coupling layer and using the distortion information to display desired images on the display in accordance with an embodiment.

FIG. 8 shows illustrative method steps for obtaining optical coupling layer distortion information and using that information to operate a display with an optical coupling layer. As shown, at step 202 the image distortion for selected pixels in the active area of the display may be characterized. For example, system 104 may be used to determine the displacement (e.g., displacement vector) between a display pixel and a corresponding optical coupling layer pixel. Displacement may be measured for any desired number of pixels in any desired pattern at step 202.

Next, at step 204, the remaining pixels in the display active area that were not characterized in step 202 may be characterized using interpolation or extrapolation. Any desired type of interpolation and/or extrapolation may be used for each pixel. By characterizing the remaining pixels in step 204, a displacement vector may be determined for every pixel in the active area of the display. In other words, after step 204 a complete distortion map is available to determine how the optical coupling layer modifies the location of light from the display active area. If desired, multiple distortion maps may be obtained at step 204, with each distortion map having an associated perceived optical coupling layer output surface shape (e.g., planar, having edges that curve away from the viewer, etc.).

Steps 206 and 208 may take place during operation of the electronic device. This is in contrast to step 202 (and optionally step 204), which may take place during manufacturing of the electronic device before the electronic device is ready for normal operation. In step 206, the determined distortion map may be used to determine display pixel data that corresponds to desired optical coupling layer pixel data. In other words, because the surface of the optical coupling layer is ultimately what is observed by the viewer, images to be displayed to the viewer may be rendered based on the optical coupling layer output surface (e.g., to fit output surface 82). The rendered optical coupling layer pixel values are then converted to display pixel values at step 206 using the distortion map (e.g., the vector values determined in steps 202 and 204). At step 208, the display pixel values may be provided to the display pixels in the active area. The display pixels in the active area will emit light that is then distorted by the optical coupling layer back into the intended image. If multiple distortion maps are available, a distortion map may optionally be selected (e.g., based on sensor data) at step 206.

The method of FIG. 8 may be used for any display with an optical coupling layer (regardless of the shape of the optical coupling layer and the shape of the display layer that emits light into the optical coupling layer).

In some cases, optical coupling layer 74 may be formed from fibers that have a uniform cross-sectional area. In these cases, the size of each optical coupling layer pixel may 96 match the size of each display pixel 44. In other words, if a given display pixel 44 is used to emit light, the corresponding light-emitting area on the output surface of the optical coupling layer will have the same surface area as the given display pixel. However, in some cases, optical coupling layer 74 may be formed from fibers with varying cross-sectional areas. For example, the cross-sectional area of the fibers may be larger at the output surface of the optical coupling layer than at the input surface.

Figure 9:
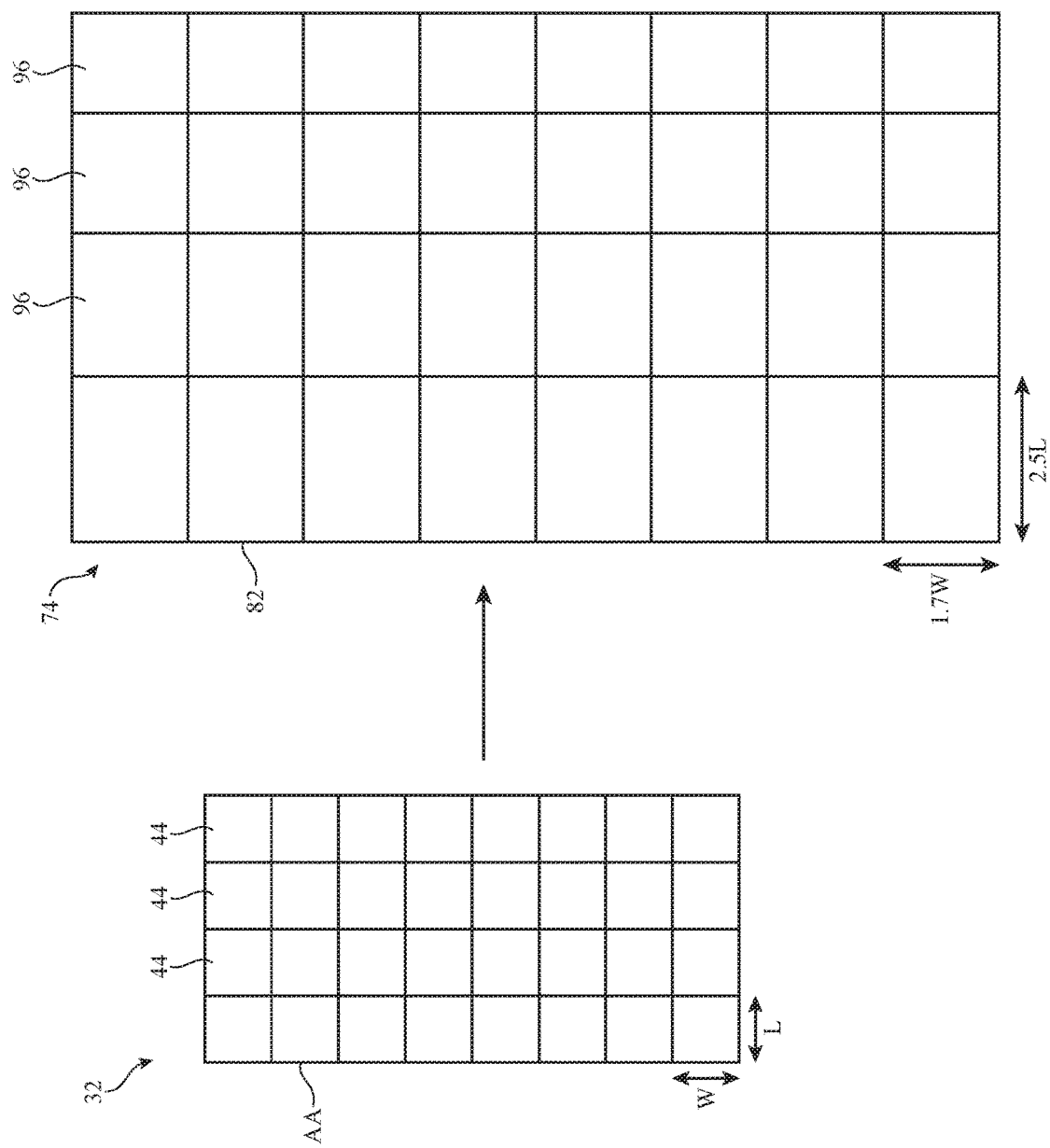
FIG. 9 is a schematic diagram showing how display pixels may have corresponding optical coupling layer pixels with different dimensions than the display pixels in accordance with an embodiment.

An example of this is shown in the diagram of FIG. 9. In FIG. 9, a selected 8×4 group of display pixels 44 in active area AA is shown. Each pixel may have a given length L and width W. Light from the display pixels is emitted into optical coupling layer 74. As shown, each display pixel 44 has a corresponding optical coupling layer pixel 96 on the output surface 82 of the optical coupling layer. However, the optical coupling layer pixels 96 do not have the same dimensions as display pixels 44. As shown, the optical coupling layer pixel in the lower-left of the 8×4 grid has a width of 1.7 W and a length of 2.5 L. In other words, the width of the optical coupling layer pixel 96 is 1.7 times larger than the width of the corresponding display pixel. Similarly, the length of the optical coupling layer pixel is 2.5 times larger than the length of the corresponding display pixel. As shown in FIG. 9, the dimensions of optical coupling layer pixels 96 may vary across the output surface.

Figure 10:
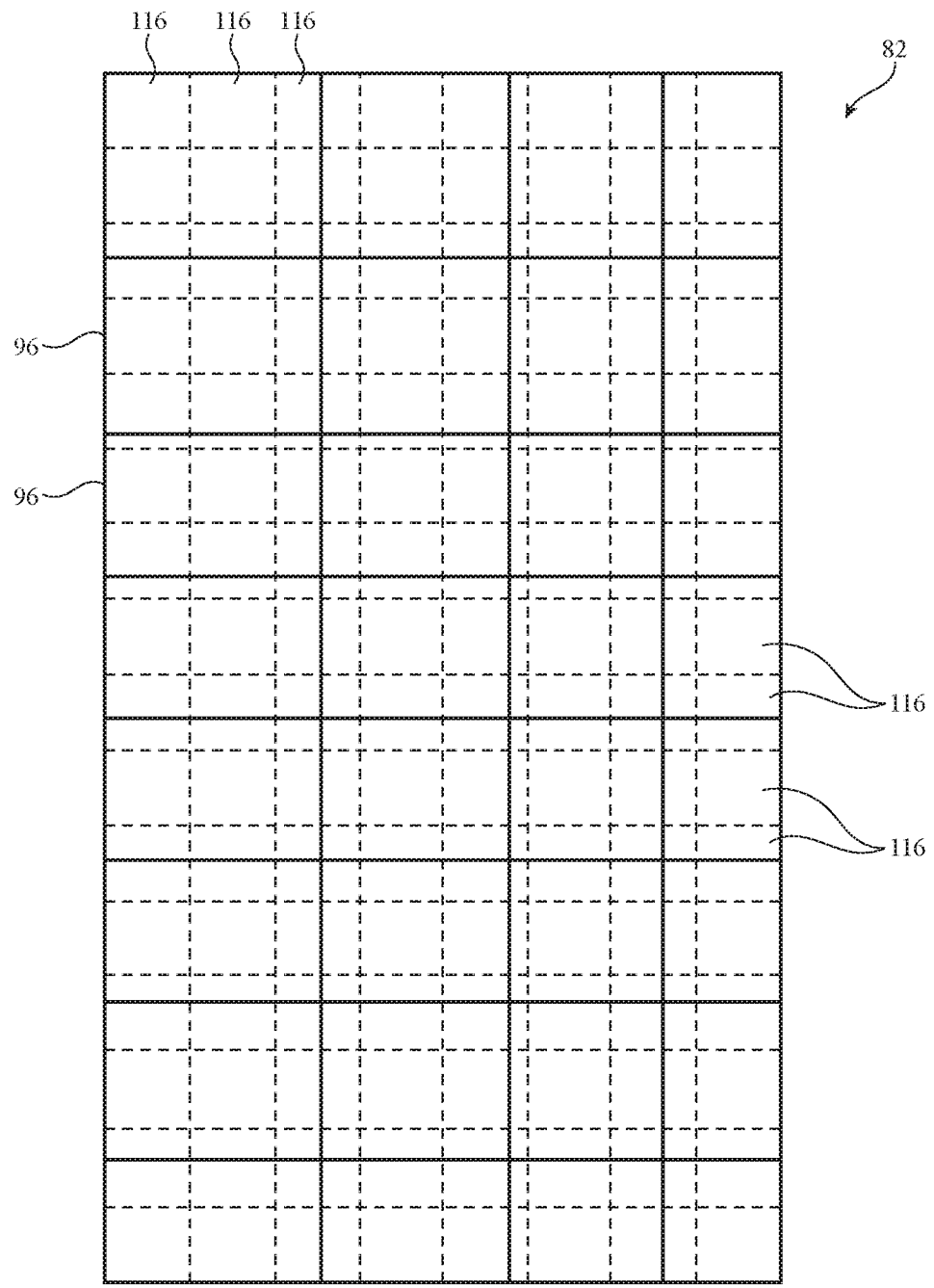
FIG. 10 is a top view of an illustrative output surface of an optical coupling layer showing how multiple intended pixels may be rendered for each optical coupling layer pixel in accordance with an embodiment.

The varying areas of each optical coupling layer pixel shown in FIG. 9 may present challenges in displaying an intended image. The intended image may not be rendered with varying pixel sizes (even though the optical coupling layer pixels have varying sizes). The intended image may instead be rendered with uniform pixel size (e.g., a C×D pixel array with uniform pixels that corresponds to output surface 82). FIG. 10 shows the relationship between the optical coupling layer pixels 96 and the rendered pixels 116.

As shown in FIG. 10, multiple rendered pixels 116 may be included in the area of each optical coupling layer pixel 96. The rendered pixels 116 are represented by the dashed lines (with a 16×8 array of uniformly sized pixels), while the optical coupling layer pixels are represented by the solid lines (with an 8×4 array of non-uniformly sized pixels). As shown, multiple rendered pixels 116 may overlap each optical coupling layer pixel 96. One rendered pixel 116 may also overlap more than one optical coupling layer pixel 96. The number of rendered pixels 116 that overlaps each optical coupling layer pixel 96 may vary.

When multiple rendered pixels 116 overlap one optical coupling layer pixel 96, each rendered pixel cannot necessarily be displayed as desired. For example, consider an example of two rendered pixels 116 that overlap one optical coupling layer pixel 96. One of the rendered pixels 116 may be intended to be black whereas the other rendered pixel may be intended to be white. However, a single optical coupling layer pixel 96 (which can only output one uniform type of light from one corresponding display pixel 44) is used to display both of the rendered pixels. To account for situations such as this, a resampling process may be performed.

Rendered pixels 116 may be initially rendered (e.g., by a graphics processing unit) with given brightness levels. For simplicity, the brightness level may be considered on a scale of 0 to 1, with 1 being the brightest (e.g., white) and 0 being the darkest (e.g., black). The resampling process may involve using the rendered pixels to produce a representative brightness that is used by the corresponding display pixel 44.

Figure 11:
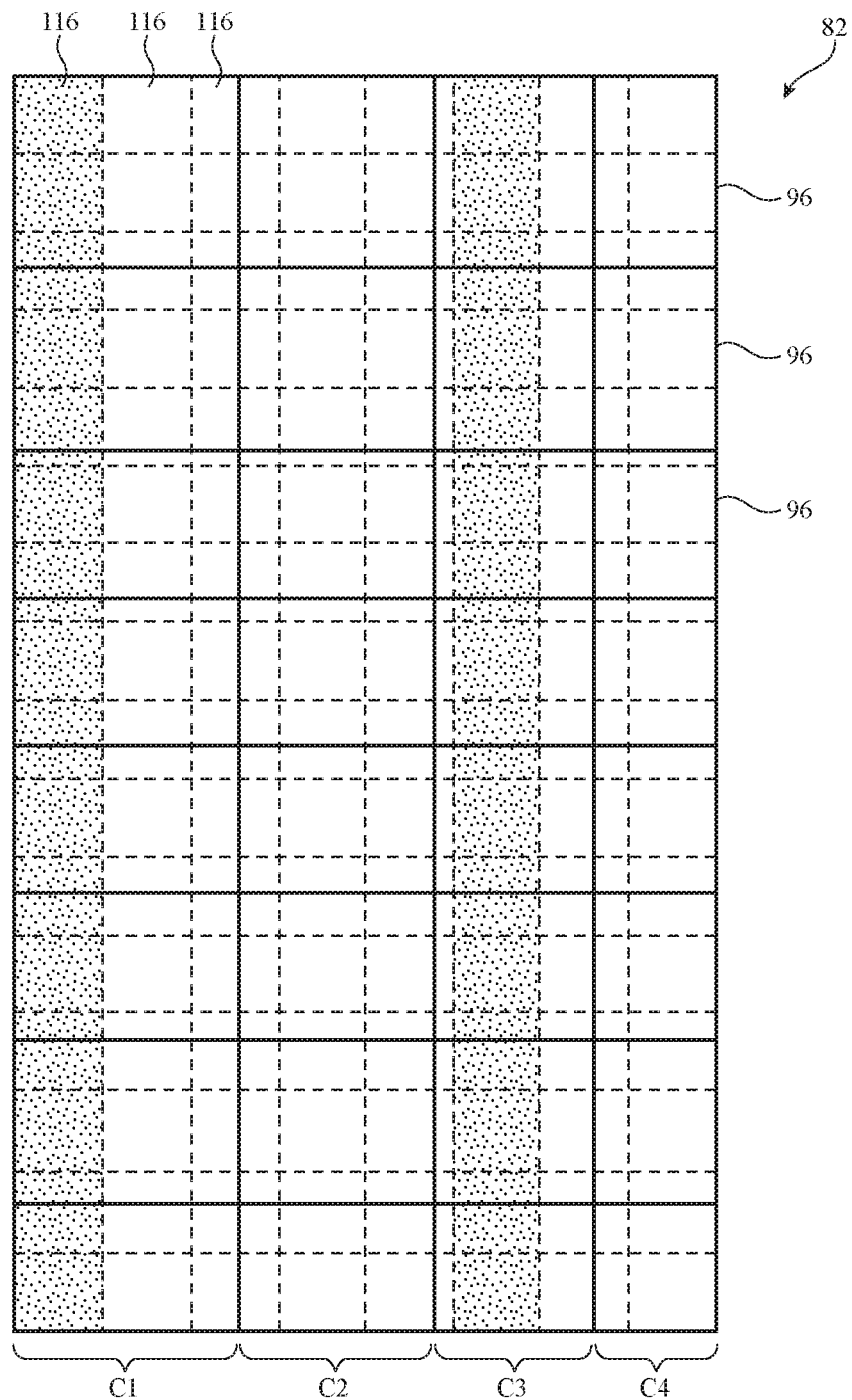
FIG. 11 is a top view of an illustrative output surface of an optical coupling layer showing how multiple intended pixels with different brightness values may be rendered for a single optical coupling layer pixel in accordance with an embodiment.

Consider the example of FIG. 11. In FIG. 11, the rendered pixels 116 include two black stripes (e.g., two columns with brightness levels of 0). The first (left-most) and sixth column of rendered pixels 116 in FIG. 11 are rendered as black and the remaining columns of rendered pixels 116 are rendered as white. For some of the optical coupling layer pixels, all of the rendered pixels have the same value. In columns C2 and C4 of optical coupling layer pixels 96, each optical coupling layer pixel includes rendered pixels with brightness values of 1. Therefore, the display pixels associated with each optical coupling layer pixel in columns C2 and C4 will have brightness values of 1.

In column C1 of optical coupling layer pixels 96, each optical coupling layer pixel includes both black and white rendered pixels. To obtain a single brightness value for each optical coupling layer pixel, resampling may be performed. The resampling may involve taking the average brightness level of the rendered pixels in the optical coupling layer pixels or any other desired techniques. For example, the average brightness level of the rendered pixels 116 in optical coupling layer pixels 96 in column C1 is 0.6. Therefore, a brightness level of 0.6 may be provided to the corresponding display pixels 44 associated with the optical coupling layer pixels in column C1.

Similarly, in column C3 of optical coupling layer pixels 96, each optical coupling layer pixel includes both black and white rendered pixels. To obtain a single brightness value for each optical coupling layer pixel, resampling may be performed. For example, the average brightness level of the rendered pixels 116 in optical coupling layer pixels 96 in column C3 is 0.44. Therefore, a brightness level of 0.44 may be provided to the corresponding display pixels 44 associated with the optical coupling layer pixels in column C3.

Figure 12:
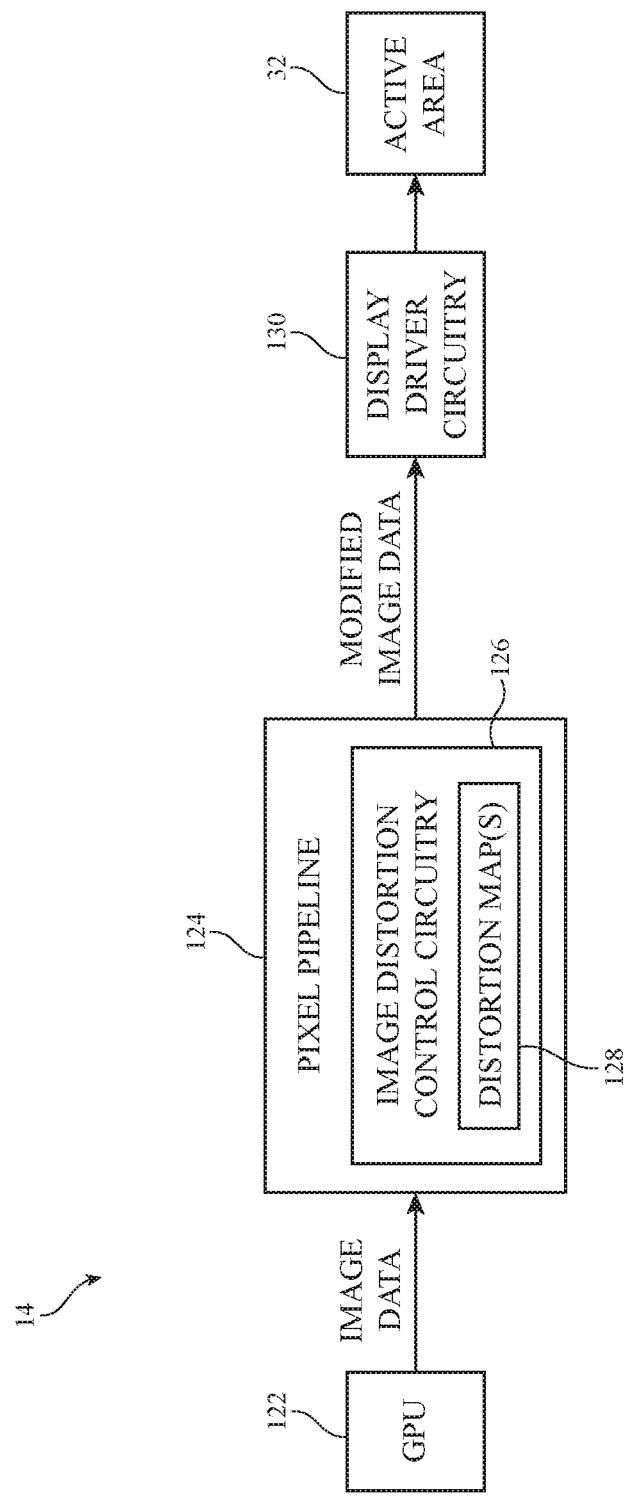
FIG. 12 is a schematic diagram of an illustrative display that modifies image data to control perceived distortion in accordance with an embodiment.

FIG. 12 shows a schematic diagram of illustrative circuitry that may be used in implementing display 14 of device 10. During operation of the display, a graphics processing unit (GPU) 122 may supply image data for images to be displayed on display 14. The image data rendered by GPU 122 may be rendered as pixels 116 as discussed in connection with FIGS. 10 and 11. In other words, the image data may be image data that is intended to be displayed on output surface 82 of optical coupling layer 74 (e.g., the final image viewed by the viewer). This example is merely illustrative. If desired, the GPU may instead render an image to be displayed on active area AA of display layer 32.

The image data may be provided from GPU 122 to pixel pipeline 124. Pixel pipeline 124 may include image distortion control circuitry 126. Image distortion control circuitry 126 may use distortion map(s) 128 to modify the image data. The modified image data is provided from the pixel pipeline to display driver circuitry 130, which may supply the image data to data lines of the display. Display driver circuitry 130 may also include gate driver circuitry which is used to assert gate line signals on gate lines of display 14. Using display driver circuitry 130, the modified image data is provided to and displayed on the active area AA of display layer 32.

Each frame of image data provided by GPU 122 may include a representative brightness value for each rendered pixel 116. Image distortion control circuitry 126 may modify the brightness value for each pixel based on the distortion map. For example, there may be a distortion map associated with a perceived planar output surface. More than one distortion maps may optionally be stored in image distortion control circuitry 126. A distortion map may be selected from the one or more distortion maps based on sensor data, a perceived distortion setting, etc.

Ultimately, image distortion control circuitry 126 may determine a brightness value for each pixel in the active area of display layer 32 (e.g., pixels 44). The brightness value of each pixel 44 may be a function of the brightness value(s) of one or more rendered pixels 116 from GPU 122. The rendered pixels 116 that contribute to the brightness of a given pixel 44 may be determined based on the distortion map 128.

The display may optionally have different distortion modes (sometimes referred to as distortion settings) and the image data may be modified based on the present distortion mode. The image distortion control circuitry 126 may modify the image data based both on the desired perceived distortion (e.g., the distortion setting) and sensor data from one or more sensors within the electronic device (e.g., sensors 16 in FIG. 1). Image distortion control circuitry 126 may receive sensor data from force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), depth sensors (e.g., structured light sensors and/or depth sensors based on stereo imaging devices), optical sensors such as self-mixing sensors and light detection and ranging (lidar) sensors that gather time-of-flight measurements, gaze tracking sensors, and/or other sensors. In one illustrative example, the sensor data may be used to identify the current location of the viewer (e.g., the current location of the viewer's eyes) of the display. The image distortion control circuitry may then modify the image data to ensure the perceived distortion matches the desired perceived distortion for a viewer at the current location.

GPU 122, pixel pipeline 124, display driver circuitry 130, and display layer 32 as shown in FIG. 12 may sometimes be collectively referred to as display circuitry. Alternatively, the active area of the display layer may sometimes be referred to as a display while GPU 122, pixel pipeline 124, and display driver circuitry 130 may sometimes collectively be referred to as control circuitry.

In the example of FIG. 12, image distortion control circuitry is incorporated into pixel pipeline 124. For example, pixel pipeline 124 may include a number of pixel pipeline blocks. A distortion control block may be incorporated before the pixel pipeline blocks to modify the image data (e.g., from intended pixel values for intended pixels 116 to display pixel values for display pixels 44) before the image data is provided to the pixel pipeline blocks. The example of image distortion control circuitry being included in the pixel pipeline is merely illustrative. If desired, image distortion control circuitry may be formed at any one or more desired locations within the circuitry shown in FIG. 12. For example, image distortion control circuitry may be incorporated into GPU 122. Image distortion control circuitry may be incorporated into display driver circuitry 130. Image distortion control circuitry may be incorporated as separate circuitry.

The foregoing is merely illustrative and various modifications can be made by those skilled in the art without departing from the scope and spirit of the described embodiments. The foregoing embodiments may be implemented individually or in any combination.

What is claimed is:

1. A method of measuring distortion in a display with a display layer that includes an array of light-emitting pixels and an optical coupling layer that guides light from an input surface that is adjacent to the array of light-emitting pixels to an output surface, the method comprising:
   displaying a target image using the array of light-emitting pixels;
   with a camera module that includes an image sensor and a telecentric lens, capturing an image of the target image on the output surface of the optical coupling layer; and
   for each one of a plurality of the light-emitting pixels, determining a displacement between a first location of the respective light-emitting pixel and a second location where light from that light-emitting pixel is output from the output surface.

2. The method defined in claim 1, wherein displaying the target image on the array of light-emitting pixels comprises displaying a checkerboard pattern on the array of light-emitting pixels.

3. The method defined in claim 2, wherein the plurality of the light-emitting pixels comprises a first plurality of the light-emitting pixels, the method further comprising:
   interpolating between the displacements of the first plurality of light-emitting pixels to determine corresponding displacements for a second plurality of the light-emitting pixels; and
   extrapolating the displacements of the first plurality of light-emitting pixels to determine corresponding displacements for a third plurality of the light-emitting pixels.

* * * * *